US008254467B2

(12) United States Patent
Fortin

(10) Patent No.: US 8,254,467 B2
(45) Date of Patent: Aug. 28, 2012

(54) METHOD AND SYSTEM FOR SCALING COMPRESSED IMAGE FRAMES

(75) Inventor: Etienne Fortin, Saint-Basile-le-Grand (CA)

(73) Assignee: Sensio Technologies Inc., Montreal, Quebec (CA)

( * ) Notice: Subject to any disclaimer, the term of this patent is extended or adjusted under 35 U.S.C. 154(b) by 941 days.

(21) Appl. No.: 12/261,819

(22) Filed: Oct. 30, 2008

(65) Prior Publication Data
US 2010/0111195 A1    May 6, 2010

(51) Int. Cl.
*H04N 7/24* (2011.01)
(52) U.S. Cl. .................................... 375/240.26; 348/43
(58) Field of Classification Search .............. 375/240.26
See application file for complete search history.

(56) References Cited

U.S. PATENT DOCUMENTS

| 5,227,878 | A | 7/1993 | Puri et al. | |
|---|---|---|---|---|
| 5,418,570 | A | 5/1995 | Ueno et al. | |
| 2003/0169247 | A1* | 9/2003 | Kawabe et al. | ............... 345/204 |
| 2003/0223499 | A1 | 12/2003 | Routhier et al. | |
| 2004/0066555 | A1* | 4/2004 | Nomura | ......................... 359/462 |
| 2005/0117637 | A1 | 6/2005 | Routhier et al. | |
| 2005/0226326 | A1 | 10/2005 | Inagaki et al. | |
| 2005/0254702 | A1 | 11/2005 | Era | |
| 2009/0168880 | A1* | 7/2009 | Jeon et al. | ................ 375/240.16 |
| 2010/0103249 | A1* | 4/2010 | Lipton et al. | ..................... 348/51 |

FOREIGN PATENT DOCUMENTS

| WO | 0039998 | | 7/2000 |
|---|---|---|---|
| WO | WO 00/39998 | * | 7/2000 |

OTHER PUBLICATIONS

International Search Report corresponding to PCT/IB2009/007792.

* cited by examiner

*Primary Examiner* — Matthew Smithers
(74) *Attorney, Agent, or Firm* — Anglehart et al.

(57) ABSTRACT

A method and system for scaling frames of a compressed image stream, each frame including a mosaic of pixels. For each frame of the encoded image stream, the even-numbered lines of the frame are scaled as a first grouping of lines, while the odd-numbered lines of the frame are scaled as a second grouping of lines. This grouping of the lines of the frame may occur within the frame itself or by dividing the frame into sub-frames, in which case the even-numbered lines of the frame are scaled independently from the odd-numbered lines of the frame and a scaled version of the frame is then generated by merging the scaled even-numbered lines of the frame with the scaled odd-numbered lines of the frame.

23 Claims, 4 Drawing Sheets

METHOD AND SYSTEM FOR SCALING COMPRESSED IMAGE FRAMES

TECHNICAL FIELD

This invention relates to the field of image scaling and more specifically to the scaling of compressed image frames.

BACKGROUND

Image scaling is commonly used in computer graphics to resize digital images. The scaling process is far from trivial, since it involves a trade-off between efficiency, smoothness and sharpness. As the size of an image is increased, the pixels which form the image become increasingly visible, making the image appear soft. Conversely, reducing the size of an image will tend to enhance its smoothness and apparent smoothness.

Various different image scaling methods exist and are well known to those skilled in the art. One such method is nearest-neighbour interpolation, whereby each pixel in an image is replaced with multiple pixels of the same colour. Other, more complex methods include linear or bilinear interpolation, bicubic interpolation and supersampling, to name but a few. While some of these image scaling methods are better at preserving smooth contours in the image, others may be simpler and less costly to implement.

When it comes to image transmission, some form of compression (also referred to as encoding) is often applied to the image streams in order to reduce data storage volume and bandwidth requirements. It is known to use a quincunx or checkerboard pixel decimation pattern in video compression. In commonly assigned US patent application publication 2003/0223499, stereoscopic image pairs of a stereoscopic video are compressed by removing pixels in a checkerboard pattern and then collapsing the checkerboard pattern of pixels horizontally. The two horizontally collapsed images are placed in a side-by-side arrangement within a single standard image frame, which is then subjected to conventional image compression (e.g. MPEG2). The decompressed standard image frame is then expanded into the checkerboard pattern and the missing pixels are spatially interpolated.

One stumbling block that has arisen in the course of implementing such image compression is that the inherent nature of the encoding may make it impossible to scale compressed image frames. More specifically, when frames of a compressed image stream are formed by arranging pixel mosaics in side-by-side or above-below arrangements, any scaling of these frames leads to artifacts (e.g. visual jagged lines) in the image frame after decompression. The scaling actually disrupts the encoding (decimation pattern) to the point that, upon decompression, the quality of the resulting image is degraded and unacceptable, irrespective of the scaling method used.

Consequently, there exists a need in the industry to provide a method for scaling compressed image frames without inducing significant artifacts in the frames upon decompression.

SUMMARY

In accordance with a broad aspect, the present invention provides a method for scaling frames of a compressed image stream, each frame including a mosaic of pixels. The method comprises, for each frame of the compressed image stream, scaling the even-numbered lines of the frame as a first grouping of lines and scaling the odd-numbered lines of the frame as a second grouping of lines.

In accordance with another broad aspect, the present invention provides a method for applying a scaling operation to frames of a compressed image stream, each frame including a mosaic of pixels. The method includes the steps of: a) receiving a frame of the compressed image stream; b) dividing the frame into first and second sub-frames, the first sub-frame consisting of the even-numbered lines of the frame, the second sub-frame consisting of the odd-numbered lines of the frame; c) applying a scaling operation to the first sub-frame, whereby the even-numbered lines of the frame are scaled; d) applying the scaling operation to the second sub-frame, whereby the odd-numbered lines of the frame are scaled independently from the even-numbered lines; and e) merging the scaled even-numbered lines of the frame with the scaled odd-numbered lines of the frame to generate a scaled version of the frame.

Advantageously, by dividing each compressed image frame into a pair of sub-frames, one of which consists of the even-numbered lines of the frame and the other of which consists of the odd-numbered lines of the frame, and then applying a scaling operation to each sub-frame independently of the other before merging together all of the scaled lines in order to generate a scaled version of the particular frame, a successful decompression of the scaled frame without substantive artifacts is possible at a later stage.

In accordance with yet another broad aspect, the present invention provides a system for scaling frames of a compressed image stream, each frame including a mosaic of pixels. The system includes a subdivider unit for receiving a frame of the compressed image stream, the subdivider unit operative to divide the frame into first and second sub-frames, the first sub-frame consisting of the even-numbered lines of the frame, the second sub-frame consisting of the odd-numbered lines of the frame. The system also includes a scaler unit for receiving the first and second sub-frames from the subdivider unit, the scaler unit operative to apply a scaling operation to each of the first and second sub-frames, whereby the odd-numbered lines of the frame are scaled independently from the even-numbered lines. A combiner unit receives the scaled first and second sub-frames from the scaler unit and is operative to generate a scaled version of the frame by merging the scaled even-numbered lines of the frame with the scaled odd-numbered lines of the frame.

In accordance with a further broad aspect, the present invention provides a system for scaling a frame of a compressed image stream, the frame including a mosaic of pixels. The system includes a scaler unit operative to scale the even-numbered lines of the frame as a first grouping of lines and to scale the odd-numbered lines of the frame as a second grouping of lines.

In accordance with yet a further broad aspect, the present invention provides a method for preparing frames of a compressed image stream for scaling, each frame including a mosaic of pixels. The method includes, for each frame of the compressed image stream, rearranging the lines of the frame such that the even-numbered lines of the frame form a first grouping of lines and the odd-numbered lines of the frame form a second grouping of lines.

BRIEF DESCRIPTION OF THE DRAWINGS

The invention will be better understood by way of the following detailed description of embodiments of the invention with reference to the appended drawings, in which.

DETAILED DESCRIPTION

As will be described hereinafter, the present invention is directed to a method and system for scaling frames of a compressed image stream.

It should be understood that the expressions "decoded" and "decompressed" are used interchangeably within the present description, as are the expressions "encoded" and "compressed". Furthermore, although examples of implementation of the invention will be described herein with reference to three-dimensional stereoscopic images, such as movies, it should be understood that the scope of the invention encompasses other types of video images as well.

Figure 1:
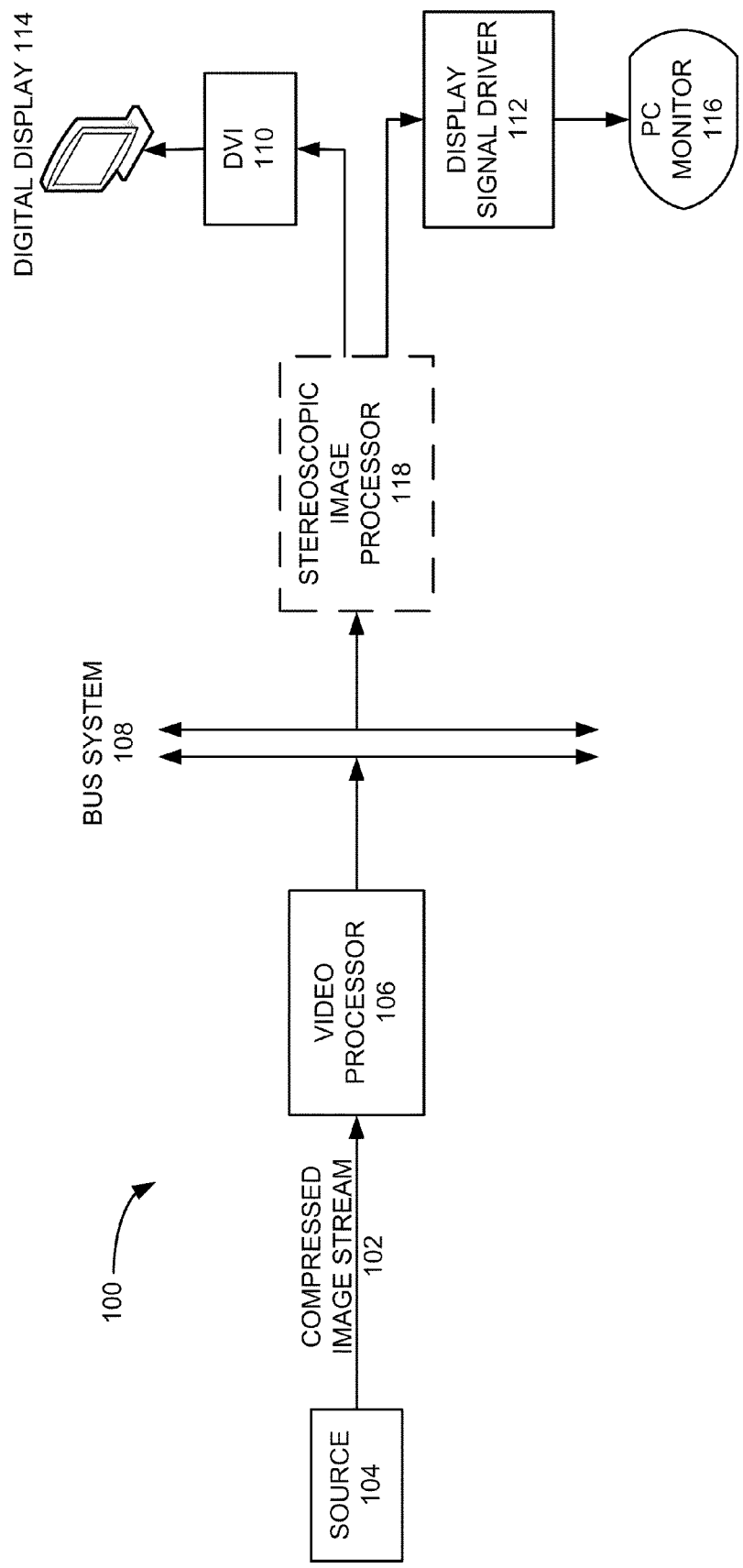
FIG. 1 is a block diagram of a simplified computer architecture for processing a compressed image stream, according to the prior art.

FIG. 1 illustrates a simplified computer architecture 100 for processing a compressed image stream, according to the prior art. As shown, the compressed image stream 102 is received by video processor 106 from a source 104. The source 104 may be any one of a various devices providing a compressed (or encoded) digitized video bit stream, such as for example a DVD drive or a wireless transmitter, among other possibilities. The video processor 106 is connected via a bus system 108 to various back-end components. In the example shown in FIG. 1, a digital visual interface (DVI) 110 and a display signal driver 112 are capable to format pixel streams for display on a digital display 114 and a PC monitor 116, respectively.

Video processor 106 is capable to perform various different tasks, including for example some or all video playback tasks, such as scaling, color conversion, compositing, decompression and deinterlacing, among other possibilities. Typically, the video processor 106 would be responsible for processing and scaling the received compressed image stream 102, as well as submitting the compressed image stream 102 to color conversion and compositing operations, in order to fit a particular resolution.

Although the video processor 106 may also be responsible for decompressing and deinterlacing the received compressed image stream 102, this interpolation functionality may alternatively be performed by a separate, back-end processing unit. In a specific, non-limiting example, the compressed image stream 102 is a compressed stereoscopic image stream 102 and the above-discussed interpolation functionality is performed by a stereoscopic image processor 118 that interfaces between the video processor 106 and both the DVI 110 and display signal driver 112. This stereoscopic image processor 118 is operative to decompress and interpolate the compressed stereoscopic image stream 102 in order to reconstruct the original left and right image sequences. Obviously, the ability of the stereoscopic image processor 118 to successfully reconstruct the original left and right image sequences is greatly hampered by any distortion or artifacts in the compressed image stream 102 that may arise as a result of processing by the video processor 106.

Figure 2:
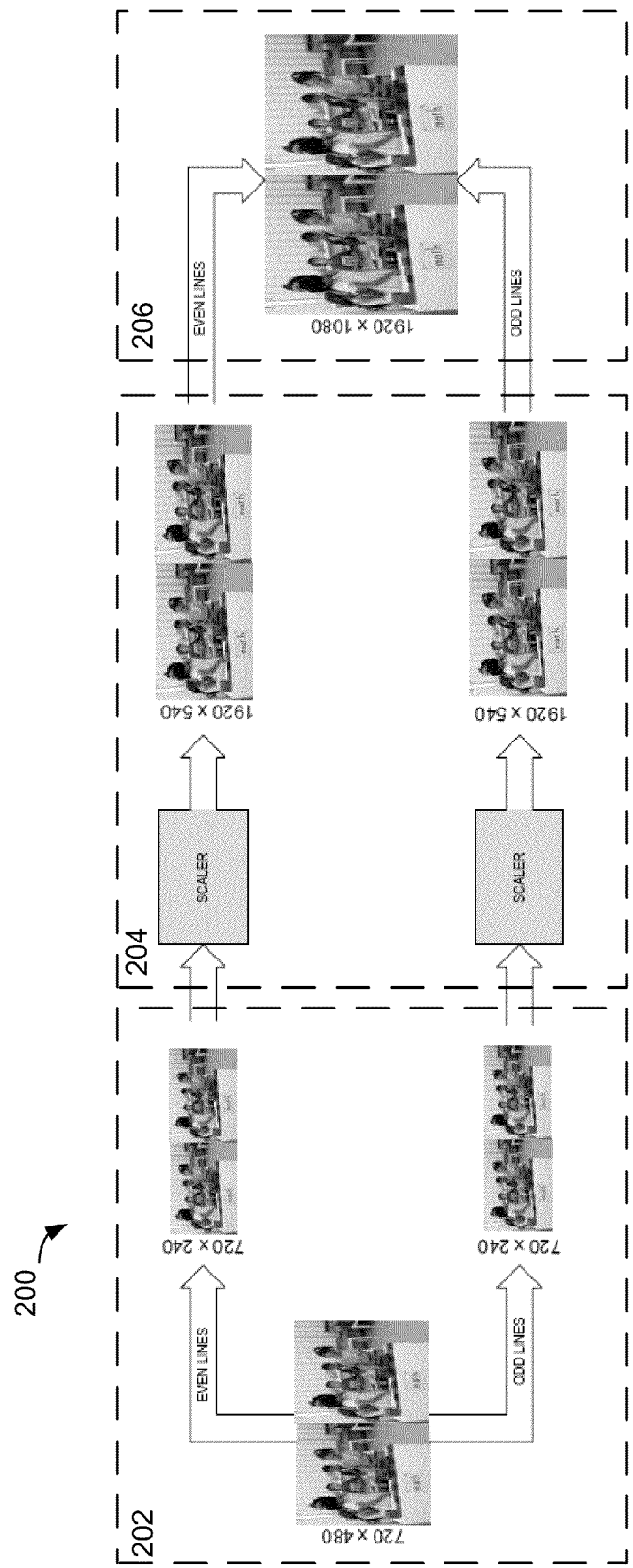
FIG. 2 illustrates a system for scaling frames of a compressed image stream, according to a non-limiting example of implementation of the present invention.

FIG. 2 illustrates a system 200 for scaling received frames of a compressed image stream, according to a non-limiting example of implementation of the present invention. For each received frame of the compressed image stream, the system 200 is operative to scale the frame on the basis of predefined groupings of the lines of the frame. More specifically, the even-numbered lines of the frame are scaled as a first grouping of lines, while the odd-numbered lines of the frame are scaled as a second grouping of lines.

As seen in the example of FIG. 2, the system 200 includes a subdivider unit 202, a scaler unit 204 and a combiner unit 206. The subdivider unit 202 operates on an N×M frame of the compressed image stream, where N is the number of vertical lines in the frame and M is the number of horizontal lines in the frame. The subdivider unit 202 is operative to arrange the even-numbered horizontal lines of the frame into a first grouping of lines and the odd-numbered lines of the frame into a second grouping of lines, by dividing the N×M frame into two N×M/2 sub-frames. The first of these N×M/2 sub-frames consists of all of the even-numbered horizontal lines of the original N×M frame, while the second sub-frame consists of all of the odd-numbered horizontal lines of the original frame. Taking as an example the case where M is an even number, the first sub-frame consists of lines 2, 4, 6, 8, ( . . . ), M of the original frame, while the second sub-frame consists of lines 1, 3, 5, 7, ( . . . ), M−1 of the original frame.

The scaler unit 204 receives as inputs both the first and second N×M/2 sub-frames and is operative to scale the sub-frames independently of one another, in order to generate first and second scaled S×T sub-frames. Although the example shown in FIG. 2 illustrates a pair of scalers within the scaler unit 204, each scaler operating on a respective one of the N×M/2 sub-frames, this is simply a functional representation of the scaler unit 204. In practice, a single scaler may be used to perform both scaling operations, that is to scale the even-numbered horizontal lines of the original N×M frame independently from the odd-numbered horizontal lines of the original frame.

It is important to note that the scaler unit 204 may implement any one of various different scaling methodologies in order to scale the N×M/2 sub-frames, such as for example linear or bilinear interpolation, bicubic interpolation and supersampling, among other possibilities. The scope of the present invention is not limited to any one particular scaling technique, but rather encompasses all of the different possible scaling techniques.

The first and second scaled S×T sub-frames are passed from the scaler unit 204 to the combiner unit 206, which is operative to combine or merge these scaled sub-frames into a S×2T frame that corresponds to a scaled version of the original N×M frame. The combiner unit 206 thus builds the S×2T frame such that its even-numbered horizontal lines correspond to the lines of the first scaled S×T sub-frame, while its odd-numbered horizontal lines correspond to the lines of the second scaled S×T sub-frame.

Advantageously, by scaling the even and odd-numbered horizontal lines of the original N×M frame independently from each other, this allows for the resulting scaled S×2T frame to be successfully decoded (or decompressed or interpolated) at some later stage in the processing of the compressed image stream, without substantive artifacts.

It should be noted that, although the example shown in FIG. 2 illustrates a scaling up of the N×M frame, and thus of the N×M/2 sub-frames, the scaler unit 204 of the system 200 may also be used to reduce the size of the N×M frame, without departing from the scope of the present invention.

Figure 3:
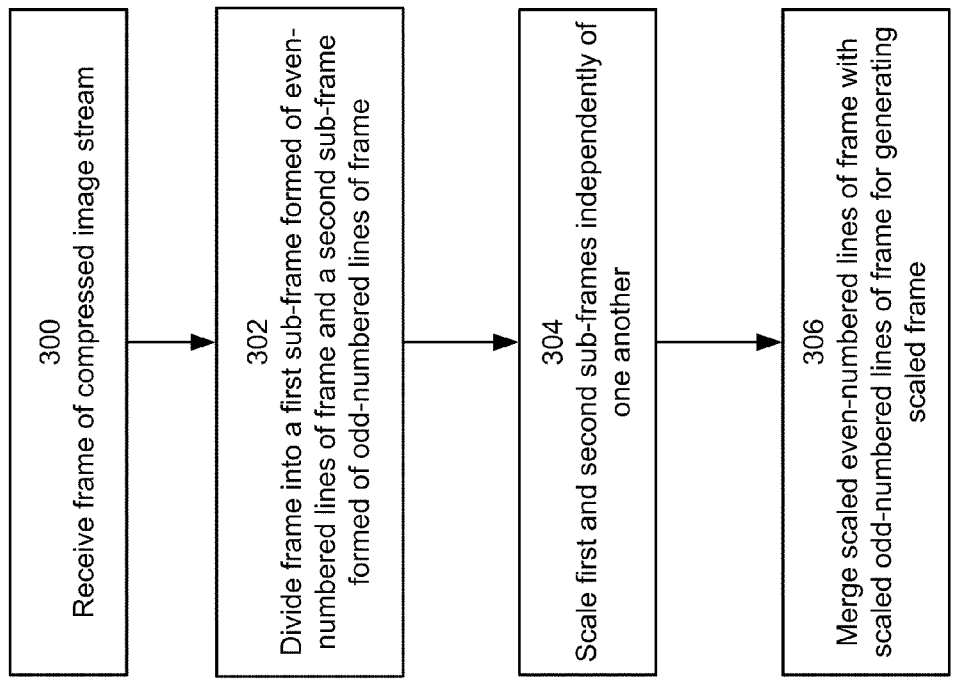
FIG. 3 is a flow diagram of a scaling process for the system shown in FIG. 2, according to a non-limiting example of implementation of the present invention.

FIG. 3 is a flow diagram illustrating the scaling process implemented by the system 200, according to a non-limiting example of implementation of the present invention. At step 300, a frame of a compressed image stream is received by the system 200. At step 302, the frame is divided into two sub-frames, the first of which is formed of all of the even-numbered horizontal lines of the frame, the second of which is formed of all of the odd-numbered horizontal lines of the frame. These first and second sub-frames are next scaled independently of one another at step 304, whereby a scaling operation is applied to the even-numbered lines of the frame separate from its application to the odd-numbered lines of the frame. At step 306, the scaled even-numbered lines of the frame are merged with the scaled odd-numbered lines of the frame, for generating a scaled version of the original frame.

In a specific, non-limiting example, the compressed image stream is a compressed stereoscopic image stream, where each frame of the stream consists of a merged image including pixels from a left image sequence and pixels from a right image sequence. In one particular example, each frame of the compressed stereoscopic image stream includes a mosaic of pixels formed of pixels from both image sequences. Upon decoding or decompression, the original stereoscopic image stream is reconstructed from these left and right image sequences. Accordingly, it is critical that the arrangement of pixels in each frame not be overly disrupted by any processing (including transmission and scaling operations) that the compressed stereoscopic image stream may undergo prior to decompression.

Figure 4B:
FIG. 4B is a frame of a compressed image that has been scaled using the process of FIG. 3 and then decompressed, according to a non-limiting example of implementation of the present invention.
Figure 4A:
FIG. 4A is a frame of a compressed image that has been scaled by traditional means and then decompressed, resulting in significant artifacts in the image frame, according to the prior art.

For illustration purposes, FIG. 4A is a stereoscopic image frame that has been compressed, scaled by traditional means and then decompressed, according to the prior art. More specifically, a scaling operation was applied to the frame as a whole, which disrupted the encoding of the compressed image frame to the point that, upon decompression, the scaled image frame presents visible jagged lines. Thus the scaling of the frame prevented a successful decompression or decoding of the frame at a later stage in the processing of the compressed stereoscopic image stream.

In contrast, FIG. 4B is a stereoscopic image frame that has been compressed, scaled using the process of FIG. 3 and then decompressed, according to a non-limiting example of implementation of the present invention. By separating out the even and odd-numbered horizontal lines of the frame and scaling these groups of lines independently from each other, the scaling of the frame does not hamper or prevent a successful decompression of the image frame. Rather, as seen in FIG. 4B, the resulting decompressed scaled frame is of an acceptable quality, free of any significant artifacts.

The components and modules of the system 200 may all be implemented in software, hardware, firmware or any combination thereof, within one piece of equipment (e.g. a DVD player) or split up among various different pieces of equipment (e.g. a DVD player and a television). In one specific, non-limiting example, the system 200 is implemented in firmware within a video processor, such as the video processor 106 shown in FIG. 1. Since standard video processors typically include one or more frame buffers, as well as a scaler unit, implementation of the system 200 would simply involve modifying the firmware of the video processor to provide for the functionality of the above-described subdivider and combiner units 202, 206. Thus, the firmware of the video processor is modified to appropriately handle and manipulate the horizontal or vertical lines of each received compressed image frame, both prior to and after application of the scaling operation by the scaler unit. Obviously, in the course of dividing out the even and odd-numbered lines from a particular frame in preparation for scaling, as well as generating a scaled version of the particular frame by merging the scaled even and odd-numbered lines, the video processor will temporarily store the lines of the particular frame in a memory, either local to the video processor or remote (e.g. a host memory via bus system). It should be noted that storage and retrieval of the even and odd-numbered lines in memory may be done in more than one way, without departing from the scope of the present invention.

In a variant embodiment of the present invention, the system and the scaling process described above act on the vertical lines of the frames of the compressed image stream, rather than the horizontal lines. Thus, it is the even-numbered vertical lines of the frame that are scaled as a first grouping of lines and the odd-numbered vertical lines of the frame that are scaled as a second grouping of lines. In the case of the example of FIG. 2, the subdivider unit 202 is operative to divide the N×M frame into two N/2×M sub-frames. The first of these N/2×M sub-frames consists of all of the even-numbered vertical lines of the original N×M frame, while the second sub-frame consists of all of the odd-numbered vertical lines of the original frame. The scaler unit 204 scales the sub-frames independently of one another, generating first and second S×T sub-frames. The combiner unit 206 is thus operative to combine the scaled sub-frames into a 2S×T frame that corresponds to a scaled version of the original N×M frame, where the even-numbered vertical lines of the 2S×T frame correspond to the lines of the first scaled S×T sub-frame and the odd-numbered vertical lines of the 2S×T frame correspond to the lines of the second scaled S×T sub-frame.

In another variant embodiment of the present invention, for each frame of the compressed image stream, the lines of the frame are rearranged within the frame itself such that the even-numbered lines of the frame form a first grouping and the odd-numbered lines of the frame form a second grouping. Each grouping thus occupies a respective half of the frame and the frame need not be divided into sub-frames to be scaled independently from one another. Rather, the scaling operation can be applied to each frame of the compressed image stream as a whole, since the lines of each frame are already arranged such that the even-numbered lines are grouped together and the odd-numbered lines are grouped together.

In a specific example of implementation of this variant embodiment, the rearranging of the lines of each frame of the compressed image stream occurs at the time of compression of the frame. Thus, in the case of the example shown in FIG. 2, the system 200 would have no need for the subdivider unit 202, while the scaler unit 204 would simply apply a straightforward scaling operation to each received frame. Since the lines of each frame input to the scaler unit 204 are already arranged such that the odd-numbered lines are grouped together and the even-numbered lines are grouped together, scaling of the frame as a whole actually results in scaling of the even-numbered lines of the frame as a first grouping and of the odd-numbered lines of the frame as a second grouping. The combiner unit 206, although unnecessary from the standpoint of merging of sub-frames, may be operative to rearrange the lines of each scaled frame output by the scaler unit 204, such that the line groupings are undone and the even and odd-numbered lines of the frame occupy their original and proper positions within the scaled frame.

In another specific example of implementation of this variant embodiment of the present invention, the rearranging of the lines of each frame of the compressed image stream occurs within the system 200, prior to the frames being input to the scaler unit 204 for scaling. In this case, the system 200 may include a functional unit that is operative to manipulate the lines of each frame received by the system 200 for rearranging the even and odd-numbered lines within the frame such that the predefined line groupings are formed, where this unit would then pass the manipulated frames to the scaler unit 204 for scaling.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A method for scaling frames of a compressed image stream, each frame including a mosaic of pixels, said method comprising, for each frame of the compressed image stream, scaling the even-numbered lines of the frame as a first grouping of lines by applying thereto a scaling operation and scaling the odd-numbered lines of the frame as a second grouping of lines by applying thereto the same scaling operation, whereby the respective mosaic of pixels is scaled such that image reconstruction from the scaled mosaic of pixels upon decompression of the frame results in a decompressed scaled frame that is free of significant artifacts.

2. A method as defined in claim 1, wherein the even-numbered lines of the frame are scaled independently from the odd-numbered lines of the frame.

3. A method as defined in claim 2, further comprising generating a scaled version of the frame by merging the scaled even-numbered lines of the frame with the scaled odd-numbered lines of the frame.

4. A method for applying a scaling operation to frames of a compressed image stream, said method comprising:
    a. receiving a frame of the compressed image stream, each frame including a mosaic of pixels;
    b. dividing the frame into first and second sub-frames, the first sub-frame consisting of the even-numbered lines of the frame, the second sub-frame consisting of the odd-numbered lines of the frame;
    c. applying a scaling operation to the first sub-frame, whereby the even-numbered lines of the frame are scaled;
    d. applying the same scaling operation to the second sub-frame, whereby the odd-numbered lines of the frame are scaled independently from the even-numbered lines;
    e. merging the scaled even-numbered lines of the frame with the scaled odd-numbered lines of the frame to generate a scaled version of the frame in which the respective mosaic of pixels is scaled such that image reconstruction from the mosaic of pixels upon decompression of the scaled version of the frame results in a decompressed scaled frame that is free of significant artifacts.

5. A method as defined in claim 4, wherein the compressed image stream is a compressed stereoscopic image stream, each frame of the compressed image stream including compressed left-eye and right-eye images merged together.

6. A method as defined in claim 5, wherein each frame of the compressed image stream comprises side-by-side merged images.

7. A method as defined in claim 5, wherein each frame of the compressed image stream includes first and second pixel mosaics arranged adjacent one another, the first pixel mosaic being formed of the pixels from the left-eye image and the second pixel mosaic being formed of the pixels from the right-eye image.

8. A method as defined in claim 4, wherein scaling of the first sub-frame and scaling of the second sub-frame are performed by a single scaler unit.

9. A method as defined in claim 4, wherein the even and odd-numbered lines of the frame are the even and odd-numbered horizontal lines of the frame.

10. A method as defined in claim 4, wherein the even and odd-numbered lines of the frame are the even and odd-numbered vertical lines of the frame.

11. A system for scaling frames of a compressed image stream, said system comprising:
    a. a subdivider unit for receiving a frame of the compressed image stream, each frame including a mosaic of pixels, said subdivider unit operative to divide the frame into first and second sub-frames, the first sub-frame consisting of the even-numbered lines of the frame, the second sub-frame consisting of the odd-numbered lines of the frame;
    b. a scaler unit for receiving said first and second sub-frames from said subdivider unit, said scaler unit operative to apply a scaling operation to said first sub-frame and to apply the same scaling operation to said second sub-frame, whereby the odd-numbered lines of the frame are scaled independently from the even-numbered lines;
    c. a combiner unit for receiving the scaled first and second sub-frames from said scaler unit, said combiner unit operative to merge the scaled even-numbered lines of the frame with the scaled odd-numbered lines of the frame to generate a scaled version of the frame in which the respective mosaic of pixels is scaled such that image reconstruction from the mosaic of pixels upon decompression of the scaled version of the frame results in a decompressed scaled frame that is free of significant artifacts.

12. A system as defined in claim 11, wherein the even and odd-numbered lines of the frame are the even and odd-numbered horizontal lines of the frame.

13. A system as defined in claim 11, wherein the even and odd-numbered lines of the frame are the even and odd-numbered vertical lines of the frame.

14. A system for scaling a frame of a compressed image stream, the frame including a mosaic of pixels, said system comprising a scaler unit operative to scale the even-numbered lines of the frame as a first grouping of lines by applying thereto a scaling operation and to scale the odd-numbered lines of the frame as a second grouping of lines by applying thereto the same scaling operation, whereby the respective mosaic of pixels is scaled such that image reconstruction from the scaled mosaic of pixels upon decompression of the frame results in a decompressed scaled frame that is free of significant artifacts.

15. A system as defined in claim 14, wherein the scaled even-numbered lines are merged with the scaled odd-numbered lines to generate a scaled version of the frame.

16. A system as defined in claim 14, wherein the even and odd-numbered lines of the frame are the even and odd-numbered horizontal lines of the frame.

17. A system as defined in claim 14, wherein the even and odd-numbered lines of the frame are the even and odd-numbered vertical lines of the frame.

18. A system as defined in claim 15, wherein said scaler unit is operative to apply said scaling operation to said first and second groupings of lines simultaneously.

19. A method for preparing frames of a compressed image stream for scaling, each frame including a mosaic of pixels, said method comprising, for each frame of the compressed image stream, rearranging the lines of the frame within the frame such that the even-numbered lines of the frame are grouped together in the frame to form a first grouping of lines and the odd-numbered lines of the frame are grouped together in the frame to form a second grouping of lines, said rearranging of the lines of the frame allowing the respective mosaic of pixels to be scaled such that image reconstruction from the mosaic of pixels upon decompression of a scaled version of the frame results in a decompressed scaled frame that is free of significant artifacts.

20. A method as defined in claim 19, wherein each of said first and second groupings of lines occupies a respective half of the frame.

21. A method as defined in claim 20, wherein said rearranging of the lines of the frame is performed at the time of compression of the frame.

22. A method as defined in claim 19, wherein said rearranging includes dividing the frame into first and second sub-frames, the first sub-frame consisting of the even-numbered lines of the frame, the second sub-frame consisting of the odd-numbered lines of the frame.

23. A method as defined in claim 22, wherein the first sub-frame is scaled independently from the second sub-frame.

* * * * *